United States Patent [19]
Ferguson

[11] Patent Number: 5,236,111
[45] Date of Patent: Aug. 17, 1993

[54] WHEELBARROW SUPPORT RACK

[76] Inventor: Jeffrey Ferguson, 681 Herbertsville Rd., Howell, N.J. 07731

[21] Appl. No.: 884,376

[22] Filed: May 18, 1992

[51] Int. Cl.$^5$ .............................................. B60R 11/00
[52] U.S. Cl. .................... 224/42.045 R; 224/42.41; 224/42.42; 211/70.6
[58] Field of Search ............ 224/42.45 R, 42.13, 224/42.12, 42.14, 42.2, 42.21, 42.23, 42.26, 42.41, 42.42, 42.43, 42.32, 42.33, 42.38, 42.39, 42.46 R, 15, 310, 281; 211/13, 70.6, 87; 248/223.4, 224.4; 296/37.1, 37.6; 410/3, 2, 7, 66, 77

[56] References Cited

U.S. PATENT DOCUMENTS

| | | | |
|---|---|---|---|
| 1,891,727 | 12/1932 | Ramsey et al. | 224/42.13 |
| 2,578,466 | 12/1951 | Ek et al. | 224/42.23 |
| 3,915,308 | 10/1975 | Ratzloff et al. | 248/223.2 X |
| 4,281,950 | 8/1981 | Lehman et al. | 410/3 |
| 4,919,381 | 4/1990 | Buiot | 224/42.45 R X |
| 5,086,958 | 2/1992 | Nagg | 224/42.42 |

Primary Examiner—Henry J. Recla
Assistant Examiner—Glenn T. Barrett
Attorney, Agent, or Firm—Clifford G. Frayne

[57] ABSTRACT

A wheelbarrow storage rack for storing and securing a wheelbarrow on a vehicle, the storage rack comprised of a frame generally dimensioned to the size of the tray of the wheelbarrow, the frame having channel members positioned on the side members and at least one cross member for cooperative, slidable engagement with the tray edge of the tray of the wheelbarrow, the wheelbarrow tray engageable with the channel members in either a vertical orientation or a horizontal orientation, the storage rack having an additional securing assembly engageable with the frame of the wheelbarrow when the storage rack is positioned in a horizontal orientation.

6 Claims, 1 Drawing Sheet

WHEELBARROW SUPPORT RACK

BACKGROUND OF THE INVENTION

1. Field of the Invention

The present invention relates in general to a storage rack for the securing and storage of a wheelbarrow and more particularly to a storage rack for securing a wheelbarrow on a vehicle.

2. Description of the Prior Art

Landscaping, general contractors and lawn maintenance companies normally travel from work site to work site with their equipment contained on a truck bed and/or on an attached trailer. The equipment/tools required for a job can vary, but would normally include small engine powered equipment and an assortment of hand tools in order to accomplish the necessary work at a particular work site. A wheelbarrow is a necessary utility item for general construction, landscaping and lawn maintenance work although its use is not always required at each and every job, nevertheless, the general contractor, landscaper or lawn maintenance person carries a wheelbarrow along with the other utility items required to accomplish his task.

Since the wheelbarrow is not required for each and every job, it occupies space on the truck bed or trailer whether needed or not. The shape and structure of the wheelbarrow is such that it does not lend itself to compact storage.

Applicant's extensive fleet of landscape construction vehicles require a wheelbarrow for each vehicle and in order to obtain the most efficient use of space on the vehicle, the Applicant has developed a storage rack which is adaptable to many types of vehicles and allows the user to mount the rack for storage of the wheelbarrow on the vehicle in either a vertical position, horizontal position, or any angle in between. The wheelbarrow is firmly secured at a location on the vehicle which permits access to the wheelbarrow, but does not overly occupy space required for other utility equipment.

Applicant's knowledge of the prior art includes U.S. Pat. No. 3,915,308 to Ratzloff, which is directed to a convertible tool storage rack which can also serve as a rack for securing a wheelbarrow in a vertical position. As will be evident from the description following hereafter, Applicant's storage rack differs significantly from that of Ratzloff and is more particularly suited for vehicle mounting, whereas the Ratzloff rack is more suitable for stationary mounting in either the home or storage or utility shed.

OBJECTS OF THE INVENTION

An object of the present invention is to provide for a novel storage rack for a wheelbarrow.

A further object of the present invention is to provide for a novel storage rack for a wheelbarrow which maintains the wheelbarrow in a secure position in either a horizontal or vertical mode or any angle therebetween.

A still further object of the present invention is to provide for a novel storage rack for a wheelbarrow particularly adaptable for mounting on a vehicle for storage and securing of the wheelbarrow in a non-interfering position.

SUMMARY OF THE INVENTION

The present invention is embodied within a storage rack having a substantially-rectangular frame, the width of the frame being equal to the width of the container portion of the wheelbarrow, the side members of the frame being affixed along a portion of their length with a C-shaped channel engageable with the lateral portions of the circumferential width of the wheelbarrow, there being at least one (1) support means secured to the frame and attachable to the wheelbarrow structure to maintain the wheelbarrow in slidable communication with the frame, the frame optionally having leg members perpendicularly disposed therefrom, the leg members for securing the frame in either a depending position from the truck bed, an elevated position from the truck bed or an extended position from the sidewalls or frame of the truck bed or vehicle.

BRIEF DESCRIPTION OF THE DRAWINGS

These and other objects of the present invention will become evident, particularly taken in view of the accompanying drawings wherein.

DETAILED DESCRIPTION OF THE DRAWINGS

Figure 1:
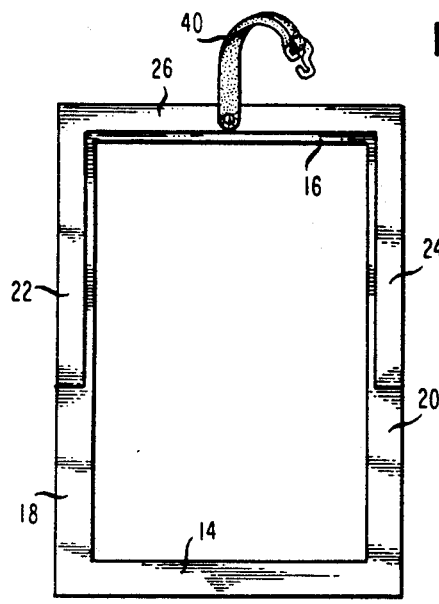
FIG. 1 is a top plan view of the storage rack.
Figure 3:
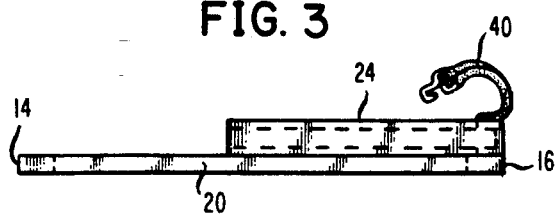
FIG. 3 is a side view of the storage rack.
Figure 2:
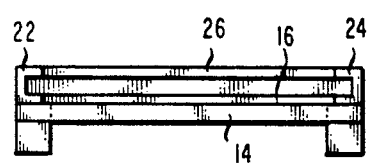
FIG. 2 is an end view of the storage rack.

FIG. 1 is a top plan view of wheelbarrow storage rack 10 with FIG. 2 being an end view and FIG. 3 being a side view. Wheelbarrow storage rack 10 is comprised of a frame 12 composed of two generally parallel cross members 14 and 16 and two side members 18 and 20. Frame 12 would preferably be composed of flat steel or similar durable material. Positioned on side members 18 and 20 are channels 22 and 24 which are C-shaped in cross section. These channels 22 and 24 are more readily discernible with reference to FIG. 2 which is an end view of wheelbarrow storage rack 10. There it can be seen that channels 22 and 24 are secured to side members 18 and 20 of frame 12 and face each other. Channels 22 and 24 would preferably be welded to side members 18 or 20 or in the alternative, be formed in the forging or bending of side members 18 and 20.

A third channel 26 is positioned on cross member 16. This channel 26 is identical to channels 22 and 24 and may extend across the length of cross member 16 and be secured to upturned lips 22 and 24 or be intermittent in its position along cross member 16.

With reference to FIGS. 2 and 3, it can be discerned that C-shaped channels 22, 24 and 26 define a retaining receptacle between side member 18 and channel 22; side member 20 and channel 24; and cross member 16 and channel 26. This retaining receptacle as will be evident with respect to discussions of the drawings that follow, is for the slidable receipt of the tightly-rolled tray edge of a wheelbarrow.

FIG. 3 and FIG. 1 illustrate the fact that channels 22 and 24 positioned on side members 18 and 20, respectively, do not extend for the full length of side members 18 and 20. It is not necessary that they extend the full length and the distance utilized is primarily one of choice depending upon the size of the wheelbarrow and wheelbarrow tray which is to be used and stored in association with this storage rack 10.

Figure 4:
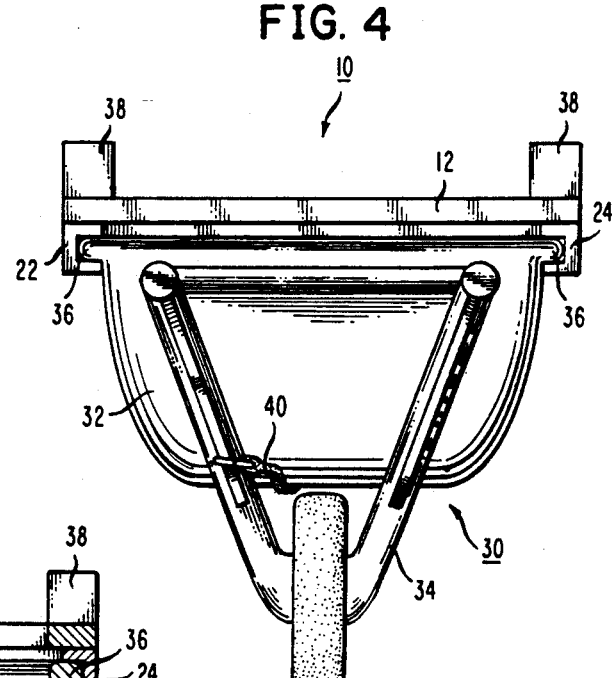
FIG. 4 is an end view of the storage rack in cooperation with a wheelbarrow.
Figure 5:
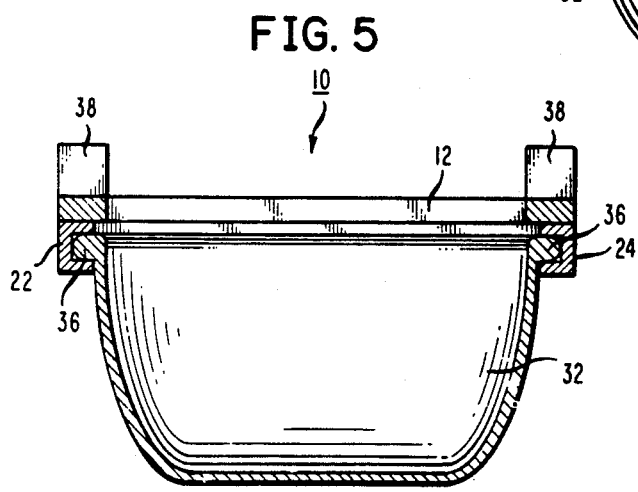
FIG. 5 is a sectional view along plane 4—4 of FIG. 4.

FIG. 4 is an end view of storage rack 10 having positioned therein, a wheelbarrow 30 comprised of a wheelbarrow tray 32 and support frame 34. The bulkiness and irregularity of shape of the wheelbarrow makes it difficult to store on a landscaping truck or trailer or general contractor's truck or trailer. Due to its irregularity in shape, it may tilt or fall to one side and possibly damage other tools or equipment. Applicant's storage rack takes advantage of the tightly-rolled tray edge 36 formed about the wheelbarrow tray 32 in order to effectuate the economical storage of the wheelbarrow on the vehicle and in the home or workshop if so d=sired. In FIG. 4, it can be seen that wheelbarrow 30 has been slidably engaged with storage rack 10 by engaging rolled tray edge 36 of wheelbarrow tray 32 in channels 22 and 24. FIG. 5 is a cross sectional view showing this engagement in more detail. In this configuration, if storage rack 10 were secured in a vertical position by means of storage legs 38, then wheelbarrow 30 could not fall forward 90° nor move laterally due to the engagement of channels 22 and 24 with tray edge 36 of wheelbarrow tray 32. Additionally, wheelbarrow 30's downward vertical movement is limited by channel 26 on cross member 16. Therefore, the only manner in which wheelbarrow 30 can be removed from storage rack 10 when storage rack 10 is positioned in a vertical position, is to vertically lift the wheelbarrow, slidably upwardly until the tray edge 36 of wheelbarrow tray 32 is completely, slidably disengaged from channels 22 and 24.

If storage rack 10 were to be mounted in a horizontal position, for example, over the cab of a truck in order to provide more room in the bed of the truck, then storage rack 10 requires an additional securing device to prevent the slidable disengagement of wheelbarrow 30 from storage rack 10 due to the stop and start motion of the vehicle. This is accomplished with respect to a securing cord 40 secured to channel 26 on cross member 16. Securing cord 40 in its preferable mode would be comprised of an elastic cord having a securing hook positioned thereon for engagement with the frame 34 of wheelbarrow 30. This would prevent the unintentional slidable disengagement of wheelbarrow 30 from storage rack 10 when positioned in a horizontal position if a vehicle stopped suddenly or accelerated suddenly.

Additionally, storage rack 10 also provides for the capability of storing wheelbarrow 30 beneath an elevated truck bed thereby creating more usable space. The situation would be just the opposite of storage rack 10 being secured in a horizontal position above the cab of the vehicle. In this situation, securing legs 38 would be secured to the underside frame of the truck bed and wheelbarrow 30 would be slidably engaged in an identical manner, only in this situation, frame 34 of wheelbarrow 30 instead of extending upwardly, would be depending downwardly. Securing strap 40 again would be utilized to maintain the wheelbarrow 30 in slidable engagement with storage rack 10 so as to prevent its disengagement under rapid acceleration or deceleration.

The present fabrication of the storage rack 10 utilizes flat steel for cross members 14 and 16 and side members 18 and 20. Channels 22, 24 and 26 are comprised of separate steel elements which are preshaped to a C-shaped cross section. These channels are then welded to the flat steel members to define the channel for receipt of the tray edge of the wheelbarrow. The channels 22, 24 and 26 could alternatively be formed by welding L-shaped and cross sectional area and welded to the side members to define a channel or could be formed and fabricated by the upturning and bending of the edges of side members 18 and 20 and cross member 16 so as to form a receiving channel for the tray edge of the wheelbarrow.

Additionally, while the embodiment disclosed herein is fabricated from steel for durability, especially when utilized by landscaping, general contractors and lawn maintenance contractors, the storage rack could be fabricated from any suitable material to secure a wheelbarrow in a stored and secure position.

While the invention has been described with reference to its preferred embodiment thereof, it will be appreciated by those of ordinary skill in the art that various changes can be made in the apparatus without departing from the basic spirit and scope of the invention.

What is claimed is:

1. A wheelbarrow storage rack adapted for storing a wheelbarrow on a vehicle, said wheelbarrow having a frame and a tray supported thereon, said tray including an edge with a front portion and side portions, said storage rack comprising:

a generally flat rectangular frame having parallel side members and parallel cross members connected thereto, said frame being dimensioned to overlie the edge of the tray of said wheelbarrow;

channel members positioned on said side members and on one of said cross members, said channel members being positioned proximate to an outer edge of said side members and said cross member, said channel members forming a C-shaped channel in cooperation with said side members and said cross member wherein said channel is adapted to receive said tray edge of said wheelbarrow therein such that said wheelbarrow is removably secured to said frame; and means for mounting said frame on said vehicle.

2. The wheelbarrow storage rack in accordance with claim 1 wherein said channel is adapted to receive the side portions and front portion of said wheelbarrow tray frame.

3. The wheelbarrow storage rack in accordance with claim 1 wherein said frame is adapted to be secured to a sidewall of a vehicle in a vertical orientation with said channel of said cross member being positioned such that said wheelbarrow tray is vertically slidably engageable within said channel.

4. The wheelbarrow storage rack in accordance with claim 1 wherein said mounting means has a plurality of securing legs extending from said frame and being adapted for mounting said frame on a vehicle in a generally-horizontal position such that said tray edge of said wheelbarrow tray is adapted to be horizontally slidably engageable with said channel of said frame.

5. The wheelbarrow storage rack in accordance with claim 4 wherein said frame has positioned thereon on said cross member having said channel member a securing means for engaging the frame of said wheelbarrow to secure said wheelbarrow to said frame when positioned in a horizontal orientation.

6. The wheelbarrow storage rack in accordance with claim 5 wherein said securing means comprises an elastic strap secured at one end to said frame, said opposing end having an engaging means for securing said opposing end to said frame of said wheelbarrow.

* * * * *